C. S. HALL.
AUTOMOBILE STEERING WHEEL.
APPLICATION FILED SEPT. 13, 1916.
1,225,622.
Patented May 8, 1917.
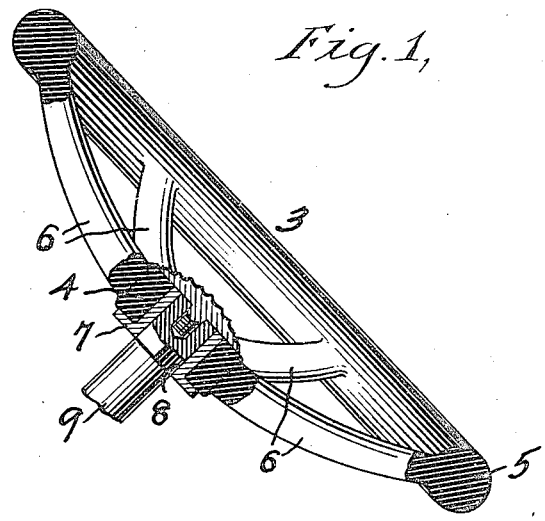
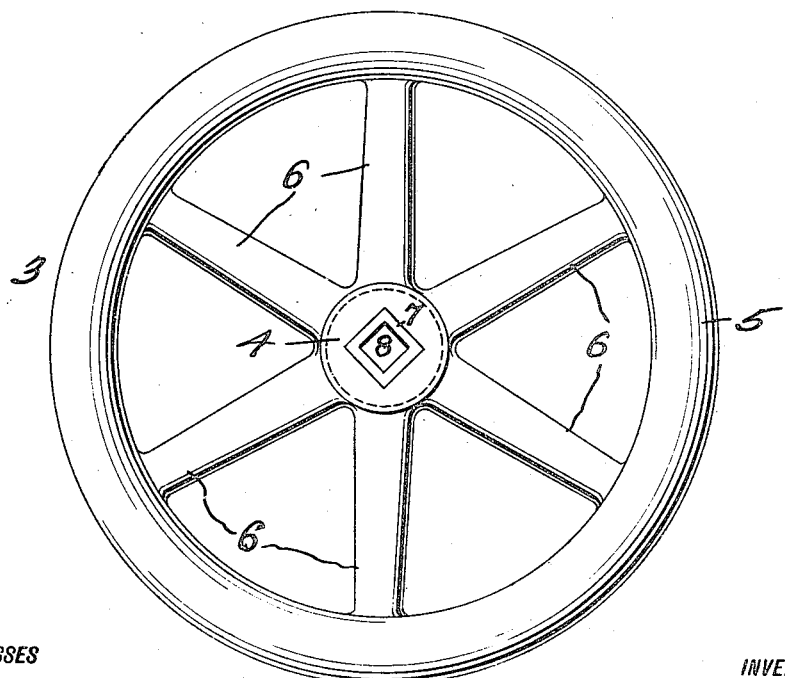
WITNESSES
Edw. Thorpe.
J. E. Larsen
INVENTOR
C. S. Hall
BY
ATTORNEYS

UNITED STATES PATENT OFFICE.

CHARLES SYBIL HALL, OF SANDCOULEE, MONTANA.

AUTOMOBILE STEERING-WHEEL.

1,225,622.  Specification of Letters Patent.  Patented May 8, 1917.

Application filed September 13, 1916. Serial No. 119,820.

*To all whom it may concern:*

Be it known that I, CHARLES S. HALL, a citizen of the United States, and a resident of Sandcoulee, in the county of Cascade and State of Montana, have invented certain new and useful Improvements in Automobile Steering-Wheels, of which the following is a specification.

My invention relates to the steering wheels of automobiles, and the main object thereof is to provide such a wheel formed of a resilient material, such as rubber, whereby the driving of the automobile is rendered easy and comfortable, which is warmer in winter than wood or metal, which will collapse or yield in case the driver is thrown against it, which may be used for purposes other than that referred to, which may be readily molded into any form, either with plain or with corrugated rim, which may be molded with any desired number of spokes or solid between rim and hub if desired, which is readily attached to the steering column of an automobile, and which is comparatively inexpensive as well as lending itself to any desired color or design.

My invention is fully described in the following specification, of which the accompanying drawings form a part, in which like characters refer to like parts in each of the views, and in which:—

Figure 1 is a central section taken through a wheel of the class described constructed in accordance with my invention; and Fig. 2 is a face view thereof.

Referring to the drawings, 3 represents a wheel having a hub 4, a rim 5, and spokes 6, formed of rubber of a yielding character, not easily yieldable except under strains, shocks, etc., said hub being provided with an immovable central socket 7 having an angular hole 8 therethrough for the reception of a similarly shaped end of a shaft 9 or the equivalent which it is desired to turn.

While the wheel will be made sufficiently rigid to meet all the requirements of driving an automobile, one of the main features thereof is its yielding to the impact of the driver's body upon a sudden stoppage of the automobile, but, as stated, other advantages are possessed by such a wheel, not the least of which is the absence of shock to the arms of a driver over rough roads, and the ease of driving whereby the driver will not be tired even after long trips.

Inasmuch as the rubber will be in a plastic state when molded, any desired color may be given thereto and which color is permanent, and any desired shape or ornamentation may be provided for in the mold.

My invention is very simple though very practical as will be at once recognized by automobile drivers, and I reserve the right to make all desired changes in and modifications of the form illustrated as properly come within the spirit of the invention and the scope of the appended claim.

Having fully described my invention, what I claim as new, and desire to secure by Letters Patent, is:—

As a new article of manufacture a steering wheel having a hub, a rim, and connecting means between the hub and rim, the whole being formed entirely of a yielding plastic material molded into form.

CHARLES SYBIL HALL.

Witnesses:
SWAN BRACKETT,
M. T. MESSELT.